(12) United States Patent
Drake

(10) Patent No.: US 6,231,771 B1
(45) Date of Patent: May 15, 2001

(54) PROCESS FOR MAKING OPTICAL WAVEGUIDES

(75) Inventor: John Paul Drake, Lambourn (GB)

(73) Assignee: Bookham Technology PLC (GB)

( * ) Notice: Subject to any disclaimer, the term of this patent is extended or adjusted under 35 U.S.C. 154(b) by 0 days.

(21) Appl. No.: 09/286,415

(22) Filed: Apr. 5, 1999

(30) Foreign Application Priority Data

Dec. 14, 1998 (GB) .................................................. 9827504

(51) Int. Cl.⁷ ...................................................... G02B 6/30
(52) U.S. Cl. ................................................. 216/24; 216/2
(58) Field of Search ............................................ 216/2, 24

(56) References Cited

U.S. PATENT DOCUMENTS

| | | | |
|---|---|---|---|
| 5,444,805 | 8/1995 | Mayer | 385/49 |
| 5,641,612 | * 6/1997 | Lee et al. | 430/321 |
| 5,700,382 | * 12/1997 | Splett | 216/24 |
| 5,787,214 | * 7/1998 | Harpin et al. | 385/49 |
| 6,063,299 | * 5/2000 | Drake et al. | 216/24 |

FOREIGN PATENT DOCUMENTS

WO 97/42534    11/1997  (WO) .

OTHER PUBLICATIONS

UK Search Report dated Jul. 15, 1999 re British Patent Application No. 9827504.3.

* cited by examiner

*Primary Examiner*—Anita Alanko
(74) *Attorney, Agent, or Firm*—Cook, Alex, McFarron, Manzo, Cummings & Mehler, Ltd.

(57) ABSTRACT

A process for treating a waveguide structure which comprises a silicon substrate with an integrally formed rib waveguide is described. The waveguide has an end portion with a facet, the end portion overhanging the silicon substrate and having an oxide layer on its underside protruding from the facet of the waveguide. A nitride layer extends over the upper surface of the waveguide and the facet. The treatment process involves etching the oxide layer from the underside, growing a new oxide layer, etching the nitride layer and then depositing a new nitride layer.

8 Claims, 4 Drawing Sheets

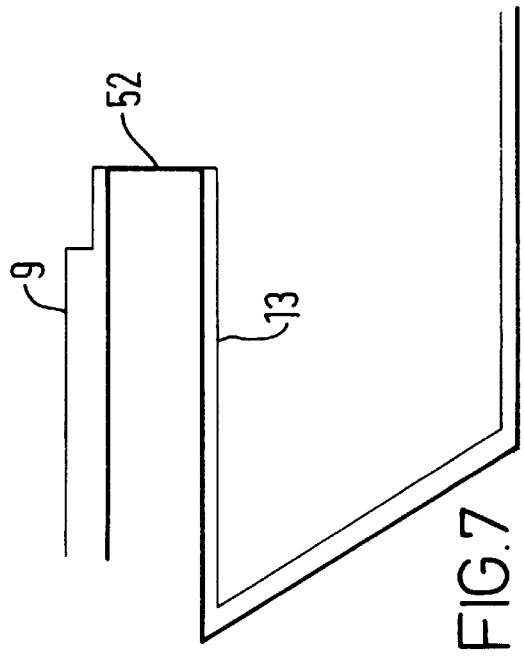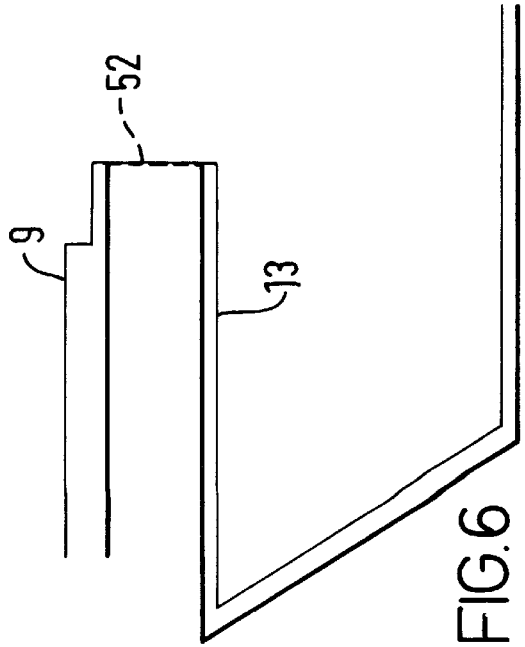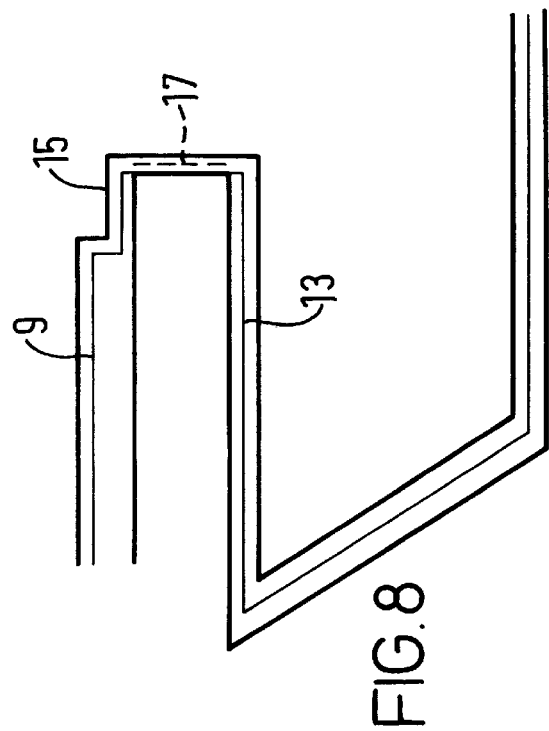

PROCESS FOR MAKING OPTICAL WAVEGUIDES

FIELD OF INVENTION

The present invention relates to a process for making optical waveguides.

BACKGROUND OF THE INVENTION

Optical fibre communication systems and optical fibre based instruments and devices often require the accurate alignment and reliable attachment of optical fibres with integrated optical devices such as waveguides integrated on a substrate. One important consideration in the design of such optical connections is that good alignment is achieved between the waveguide and the optical fibre. A typical structure of such an optical connection is that of a fibre set within a V-groove to a waveguide integrated on a silicon substrate. Such a structure based on silicon rib or ridge waveguides integrated on silicon insulator wafer is described in PCT GB96/01068. In order to achieve a good connection, the fibre should be brought to within a gap of 5μm or less of the waveguide facet. Since the V-groove does not have an end face perpendicular to the base of the groove, but rather it is set at an angle towards the base, it is desirable to undercut the waveguide to form a waveguide structure overhanging the angled face like a "diving board". Such a concept can be found in PCT/GB96/01068. Whilst this particular concept is a desirable way of achieving the appropriate alignment features, processing tolerances can cause the overhanging structure to exhibit an unwanted "shelf" of buried oxide extending beyond the end facet of the waveguide after the V-groove has been formed. When a nitride layer is deposited over the end face containing the oxide shelf, a small nitride "shelf" can likewise be formed. If left, the shelves would distort the exit of optical waves from the waveguide. It is an aim of this invention to improve the surface quality of the waveguide facet to provide an improved optical connection to an optical fibre.

SUMMARY OF THE INVENTION

According to one aspect of the present invention there is provided a process for treating a waveguide structure comprising: a silicon substrate with an integrally formed rib waveguide, the waveguide comprising an end portion with a facet, the end portion overhanging the silicon substrate and having an oxide layer on its underside protruding from the facet of the waveguide, and a nitride layer extending over the upper surface of the waveguide and the facet, the process comprising:

i) carrying out an oxide etch step to remove the oxide layer from the underside;

ii) carrying out an oxide growth step to form a new oxide layer on exposed silicon on the underside, said new oxide layer terminating at the facet;

iii) carrying out a nitride etch step to remove the nitride layer; and iv) depositing a new nitride layer extending over the upper surface and facet without protruding beyond the facet, such that silicon nitride is formed on the facet.

According to another aspect of the invention there is provided a process for making a waveguide structure in a silicon-on-insulator wafer comprising a silicon substrate, a layer of oxide on top of the silicon substrate and a layer of epitaxial silicon on top of the layer of oxide, the process comprising: defining a rib waveguide in the epitaxial layer; etching through the epitaxial layer on either side of the rib waveguide at an end portion thereof to expose the buried oxide layer; depositing oxide and nitride layers successively on the rib waveguide; undercutting the end portion to form a V-groove in the silicon substrate for aligning an optical fibre to the waveguide structure, said undercutting step leaving an unwanted part of the buried oxide layer extending beyond an end facet of the rib waveguide; and treating the waveguide structure by a process as defined hereinabove.

The etch steps and deposition steps (i) to (iv) above can be carried out as blanket processes, without the need for masking. Therefore, the process is quite simple to implement. The thickness of the new nitride layer can be controlled to control the optical properties of the silicon nitride formed on the facet.

For a better understanding of the present invention and to show how the same may be carried into effect reference will now be made by way of example to the accompanying drawings.

BRIEF DESCRIPTION OF THE DRAWINGS

FIG. 6 is a schematic side view of a waveguide overhanging a V-groove, after the unwanted nitride has been removed;

FIG. 7 is a schematic side view of a waveguide overhanging a V-groove, after further unwanted oxide has been removed from the facet;

FIG. 8 is a schematic side view of a waveguide overhanging a V-groove, after the final stage of the process according to an embodiment of the present invention has been carried out.

In the figures like reference numerals indicate like parts.

DESCRIPTION OF THE PREFERRED EMBODIMENT

Figure 1:
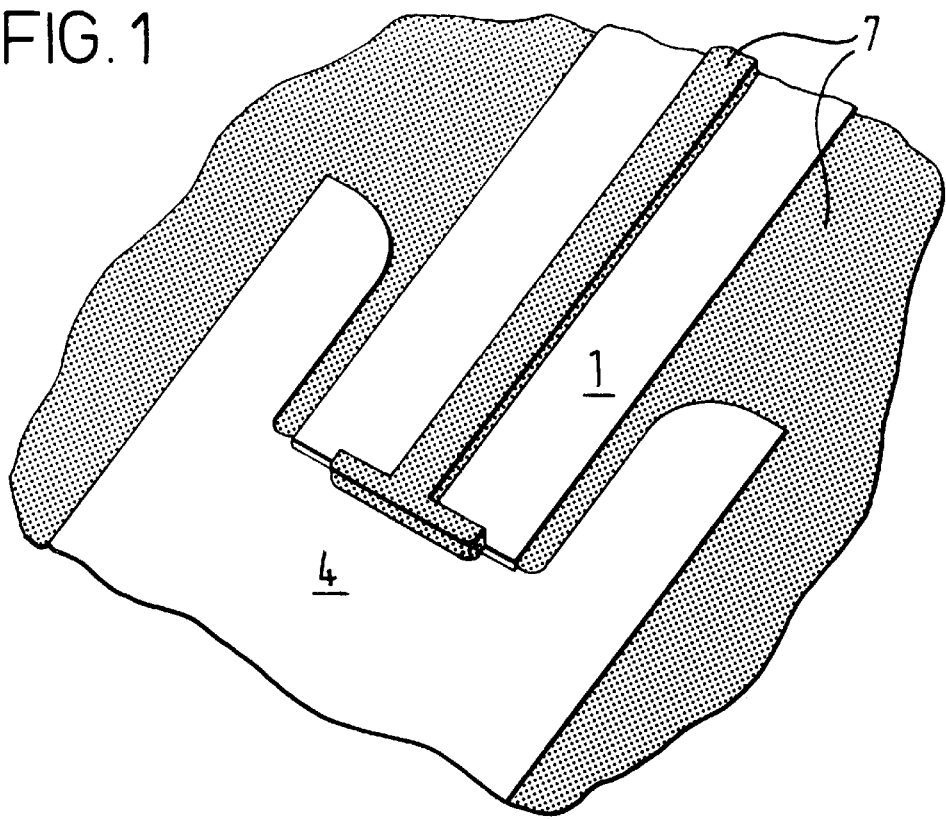
FIG. 1 is a view of an end portion of a silicon-on-insulator rib waveguide at an intermediate processing stage.

The rib waveguide described herein is based on a silicon-on-insulator chip. A process for forming this type of chip is described in a paper entitled "Reduced defect density in silicon-on-insulator structures formed by oxygen implantation in two steps" by J. Morgail et al, Applied Physics Letters, 54, page 526, 1989. This describes a process for making silicon-on-insulator wafer. The silicon layer of such a wafer is then increased, for example by epitaxial growth, to make it suitable for forming the basis of the integrated waveguide structure described herein. FIG. 1 shows a view of an end portion of an optical waveguide formed on such a chip. The chip comprises a layer of silicon 1 which is separated from the silicon substrate 4 by a layer of silicon oxide 3. The rib waveguide 2 is formed in the silicon layer 1. FIG. 1 also shows an oxide cladding 7 formed on the top of the rib waveguide 2. Further details of this form of waveguide are given in a paper entitled "Low loss single mode optical waveguides with large cross-section in silicon-on-insulator" by J. Schmidtchen et al in Electronic Letters, 27, page 1486, 1991 and in PCT Patent Specification No. WO95/08787.

This form of waveguide provides a single mode, low loss (typically less than 0.2 dB/cm for the wavelength range 1.2 to 1.6 microns) waveguide typically having dimensions in the order of 3 to 5 microns which can be coupled to optical fibres and which is compatible with other integrated components.

Figure 2:
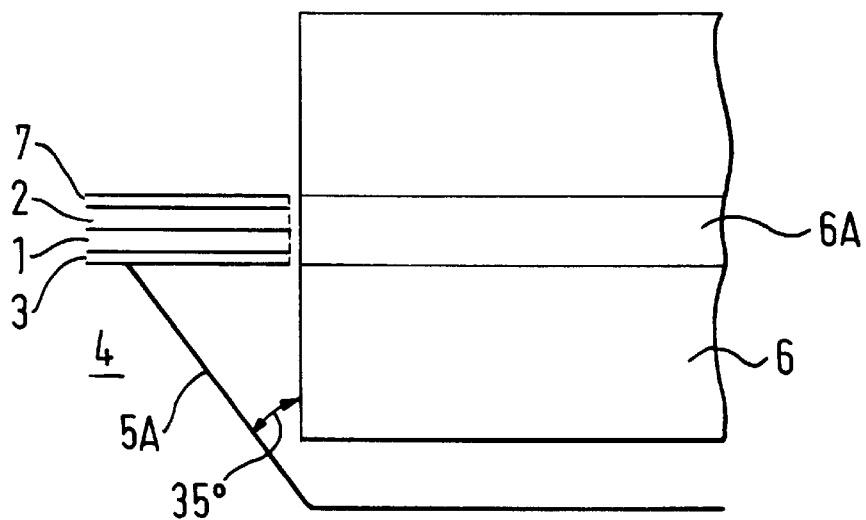
FIG. 2 is a schematic side view of a waveguide connection to an optical fibre.

FIG. 2 is a side view of the final form of the integrated structure for coupling of the waveguide to an optical fibre 6. The buried oxide layer 3 has a lower refractive index than the rib waveguide 2 so that optical waves are confined within the rib waveguide. A layer of thermal oxide 7 is formed over the waveguide to provide waveguide cladding. An etched back slope 5A is formed during the etching of a V-groove in the substrate 4 to create an overhanging "diving board" structure 50 for connection to the optical fibre 6.

A process for making such a structure will now be described, starting from the basic silicon-on insulator wafer.

Figure 1A:
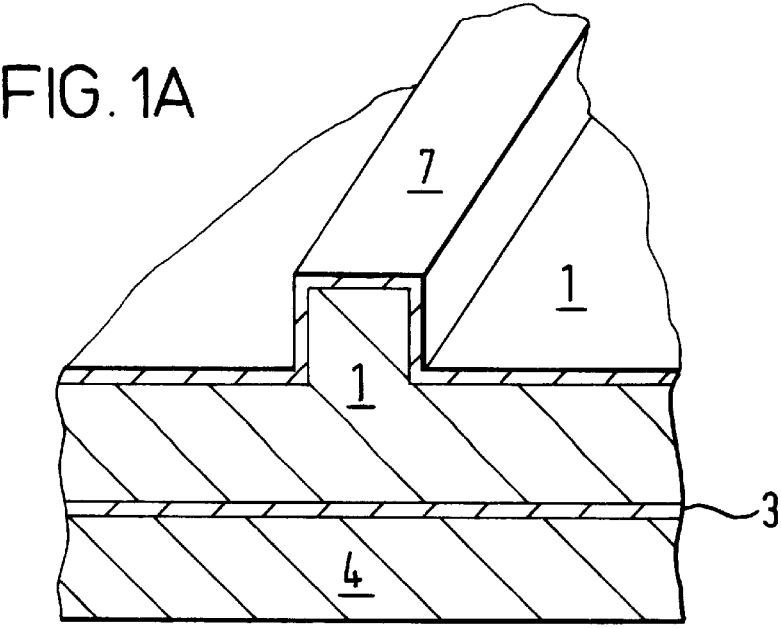
FIG. 1A is a perspective view of a cross-section through the rib waveguide.

The first stage is to deposit a layer of thermal silicon dioxide 7 which will provide a cladding layer on the epitaxial silicon 1 to a thickness of about 7000 Å. Then the wafer is patterned in resist and an etch into the thermal oxide 7 is performed to form an initial ridge structure. This exposes the epitaxial silicon on either side of the initial ridge structure. The resist is removed, and then the epitaxial silicon is etched 1.45 μm to form the ridge waveguide 2. A cross-section through the ridge at this stage is shown in FIG. 1A.

The next step is to fully form the end facet 52 of the waveguide. The wafer is patterned in resist, avoiding the partially formed facet in order to maintain alignment. The exposed epitaxial silicon is then over etched in the area that will later contain the V-groove to reveal the buried oxide layer 3. The waveguide facet is now fully formed and has a "T-junction" shape at the facet when viewed from above as shown in FIG. 1.

FIG. 2 further shows an optical fibre 6 having a core 6A. It can be seen from the figure that due to the angle of the etched back slope 5A it would be difficult to place the optical fibre close enough to the waveguide facet 52 if the waveguide were not overhanging the back slope. Therefore, in order to produce the arrangement of FIG. 2, the next stages of the process include the formation of the V-groove and undercutting of the waveguide at its end portion, thus allowing a fibre to be closely aligned with the waveguide.

The resist remaining from the previous step is removed and a layer of wet silicon dioxide approximately 0.35 μm thick is thermally grown to cover the entire wafer. The facet is then patterned in resist and a wet overetch is performed, which means the facet is now free of oxide, while the rest of the ridge structure is still covered. A suitable etchant is hydrogen fluoride.

The resist is removed and a thin layer of dry oxide (200 Å) is grown to protect the facet from a subsequent wet nitride etch. Such an etch could potentially cause light phosphorous doping in the silicon.

The next step is to deposit a 500 Å layer of LPCVD silicon nitride over the rib structure and exposed buried oxide. Because this layer is deposited in a furnace, reaction with the atmosphere in the furnace causes a nitox layer (40 Å thick) to be formed on top of the nitride. A nitride removal layer is patterned in resist and the nitox is wet etched. The resist is then stripped and the nitride is wet etched from the area around the ridge which will form the V-groove area in the next stages. In this way the nitox is the etch mask and the nitride removal defines where the oxide will be removed in the following stage.

The following step is the start of formation of the V-groove. The V-groove area is patterned in resist and the buried oxide is wet etched 0.8 μm in the exposed areas as defined by the nitox mask down to the substrate 4.

The final step is to remove the resist and etch into the silicon substrate 4 to define the V-groove. This is a fast crystallographic etch which undercuts the ridge waveguide leaving its end portion as a "diving board" overhanging the V-groove. The actual ridge is 1.45 μm high and the height of the remainder of the diving board is 2.8 μm. The structure at this stage is shown in FIG. 3 in side section.

Figure 3:
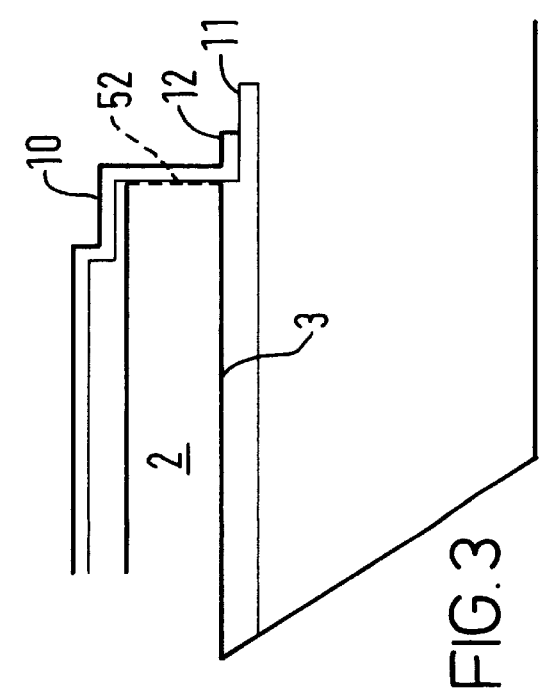
FIG. 3 is a schematic side view of a waveguide overhanging a V-groove, showing an unwanted shelf of oxide and nitride.

As shown in FIG. 3, there is an unwanted "shelf" growing beyond the end facet 52 of the waveguide. This consists of an oxide part 11 which is a residue of the buried oxide layer and a nitride part 12. Both were left during the etching process because it is not possible to precisely align an etch mask with the facet. The rib waveguide 2 is in the epitaxial silicon 1 and is totally encased by oxide and nitride. The oxide on the underside of the waveguide 2 is indicated by reference numeral 3 because it is part of the buried oxide layer and the layer of nitride over the upper surface and facet of the waveguide is indicated by 10. Furthermore there is a small amount of unwanted oxide 14 remaining on the facet 52 which was left after growing the 200 Å layer of dry oxide.

The remaining figures show the removal of the unwanted shelves and subsequent production of an efficient waveguide structure which has protective layers on upper and lower surfaces and an anti-reflective silicon nitride coating on the end facet.

Figure 4:
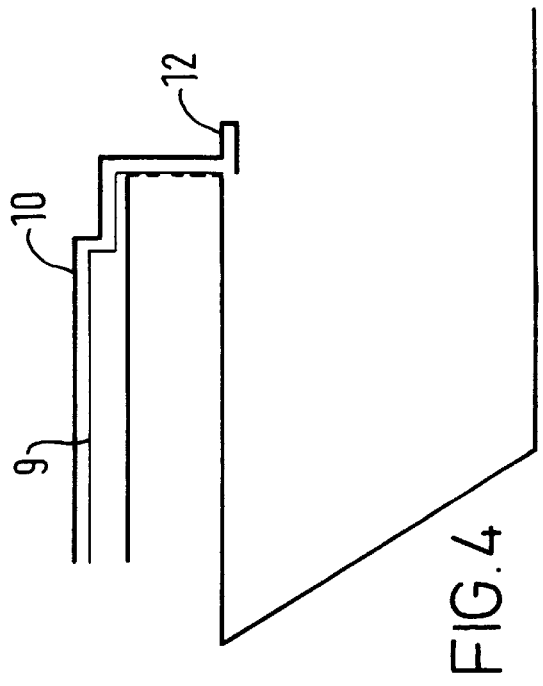
FIG. 4 is a schematic side view of a waveguide overhanging a V-groove, after the unwanted oxide is removed.
Figure 5:
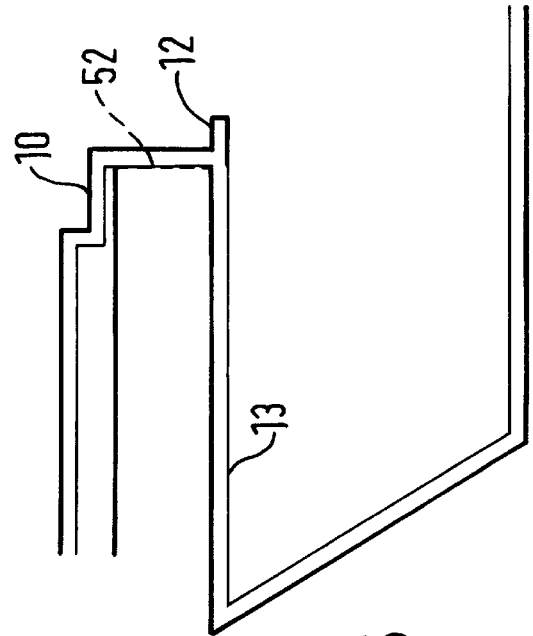
FIG. 5 is a schematic side view of a waveguide overhanging a V-groove, after oxide has been re-grown on the lower surface.

Firstly the oxide layer 3 and extra part 11 is removed using a wet etch. This results in the structure as depicted in FIG. 4. Then a protective oxide layer 13 is re-grown on the exposed silicon on the underside of the waveguide and around the V-groove. The purpose of this layer, as for any oxide layer deposited around the waveguide, is to smooth the oxide/silicon interface and to prevent any dust particles from affecting the effective refractive index of the waveguide. At this stage the nitride part 12 still remains. A nitride etch removes this part 12 and the nitride 10 on the upper surface leaving the structure shown in FIG. 6. The facet 52 is now exposed apart from a small thickness of unwanted oxide remaining on it. Then, the facet is dipped in etchant for a short period of time to remove this oxide, leaving a pure silicon facet 52 as shown in FIG. 7. All the etches involved between the stages shown in FIGS. 3 to 8 are "blanket" etches which is cost-effective because no patterning is required.

The final treatment is to re-deposit a nitride layer 15 around the entire waveguide and V-groove area. On the facet 52, this forms a layer of silicon nitride 17 which acts as an anti-reflective coating to ensure that there is a low-loss fibre-waveguide interference.

What is claimed is:

1. A process for treating a waveguide structure comprising:
   a silicon substrate with an integrally formed rib waveguide, the waveguide comprising an end portion with a facet, the end portion overhanging the silicon substrate and having an oxide layer on its underside protruding from the facet of the waveguide, and a nitride layer extending over the upper surface of the waveguide and the facet, the process comprising:

i) carrying out an oxide etch step to remove the oxide layer from the underside;

ii) carrying out an oxide growth step to form a new oxide layer on exposed silicon on the underside, said new oxide layer terminating at the facet;

iii) carrying out a nitride etch step to remove the nitride layer; and iv) depositing a new nitride layer extending over the upper surface and facet without protruding beyond the facet, such that silicon nitride is formed on the facet.

2. A process according to claim 1, wherein the waveguide structure comprises an unwanted layer of oxide on the facet and wherein the process comprises an additional step (v) after step (iii) of removing the unwanted oxide layer.

3. A process according to claim 1, wherein step (iv) is a blanket deposition step.

4. A process according to claim 1, wherein the thickness of the new nitride layer is controlled to control the optical properties of the facet.

5. A process for making a waveguide structure in a silicon-on-insulator wafer comprising a silicon substrate, a layer of oxide on top of the silicon substrate and a layer of epitaxial silicon on top of the layer of oxide, the process comprising:

defining a rib waveguide in the epitaxial layer;

etching through the epitaxial layer on either side of the rib waveguide at an end portion thereof to expose the buried oxide layer;

depositing oxide and nitride layers successively on the rib waveguide;

undercutting the end portion to form a V-groove in the silicon substrate for aligning an optical fibre to the waveguide structure, said undercutting step leaving an unwanted part of the buried oxide layer extending beyond an end facet of the rib waveguide; and treating the waveguide structure by a process as defined hereinabove in accordance with claim 1.

6. A process according to claim 2, wherein the waveguide structure comprises an unwanted layer of oxide on the facet and wherein the process comprises an additional step (v) after step (iii) of removing the unwanted oxide layer.

7. A process according to claim 3, wherein step (iv) is a blanket deposition step.

8. A process according to claim 4, wherein the thickness of the new nitride layer is controlled to control the optical properties of the facet.

* * * * *